No. 833,398. PATENTED OCT. 16, 1906.
F. J. LANCASTER.
VEHICLE WHEEL.
APPLICATION FILED OCT. 23, 1905.
2 SHEETS—SHEET 1.
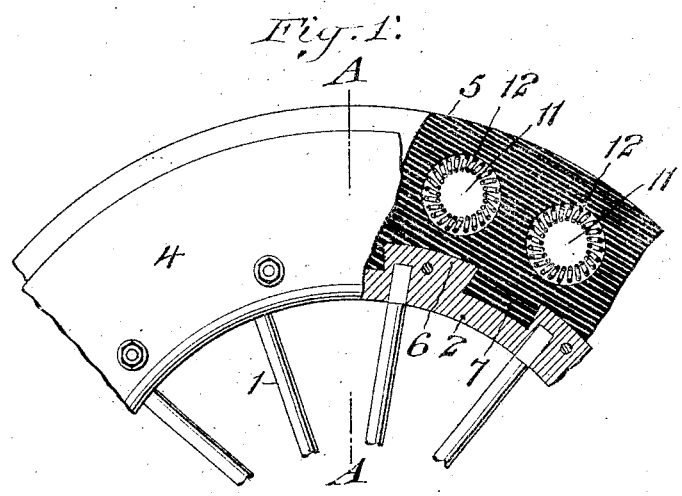
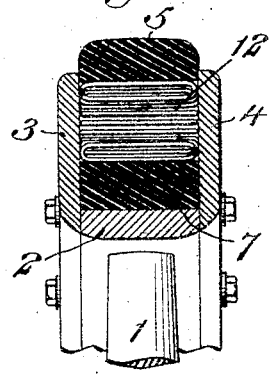
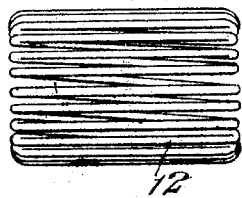
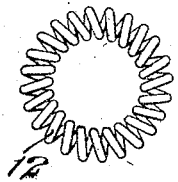
Witnesses:
F. George Barry
Henry Thieme
Inventor:
Frederick J. Lancaster
by attorneys
Brown & Seward No. 833,398. PATENTED OCT. 16, 1906.
F. J. LANCASTER.
VEHICLE WHEEL.
APPLICATION FILED OCT. 23, 1905.

2 SHEETS—SHEET 2.

Witnesses:-
F. George Barry.
Henry Thieme

Inventor:-
Frederick J. Lancaster
by attorneys
Brown & Seward

UNITED STATES PATENT OFFICE.

FREDERICK J. LANCASTER, OF NEW YORK, N. Y.

VEHICLE-WHEEL.

No. 833,398.

Specification of Letters Patent.

Patented Oct. 16, 1906.

Application filed October 23, 1905. Serial No. 283,999.

*To all whom it may concern:*

Be it known that I, FREDERICK J. LANCASTER, a citizen of the United States, and a resident of the borough of Manhattan, in the city and State of New York, have invented a new and useful Improvement in Vehicle-Wheels, of which the following is a specification.

The object of my invention is to provide an improvement in vehicle-wheels; and it consists in providing a wheel-felly and tire of rubber compound or analogous material and springs wholly embedded within the tire.

A further object is to provide certain improvements in the construction, form, and arrangement of the several parts whereby a wheel is produced in which the tire may be locked to the felly independently of the springs and the springs may be utilized for assisting in the resiliency of the tire.

Figure 5:
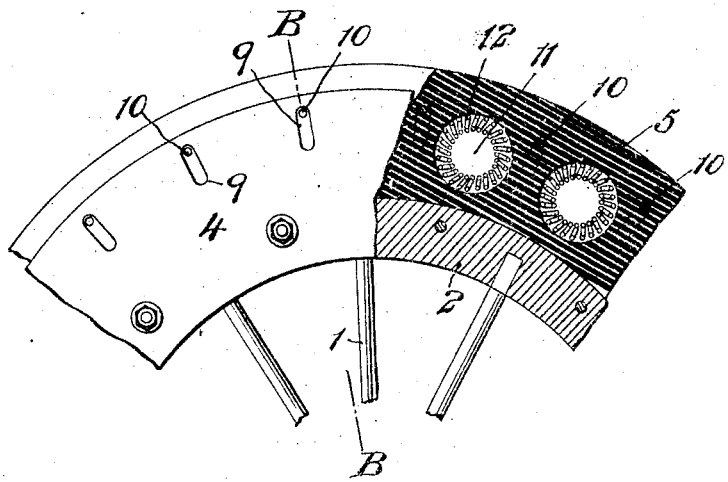
Figure 6:
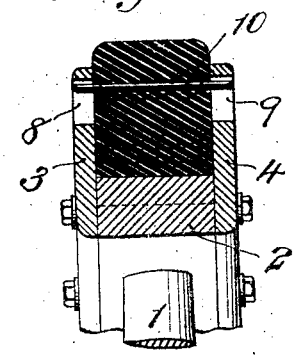

In the accompanying drawings, Figure 1 represents in side elevation, partially in longitudinal central section, a portion of a vehicle-wheel, illustrating one embodiment of my invention. Fig. 2 is a cross-section taken in the plane of the line A A of Fig. 1. Fig. 3 is a view in side elevation of the form of spring which I choose to embed within the tire. Fig. 4 is an end view of the spring. Fig. 5 represents in side elevation, partly in longitudinal central section, a portion of a vehicle-wheel, illustrating another embodiment of my invention; and Fig. 6 is a cross-section taken in the plane of the line B B of Fig. 5.

The vehicle-wheel spokes are denoted by 1, and the felly by 2. The felly side plates are denoted by 3 and 4. The tire is denoted by 5 and is composed of rubber compound or analogous material. This tire is locked to the felly against longitudinal movement thereon. In the form shown in Figs. 1 and 2 the interlocking means comprises outwardly-extending projections 6 on the felly and inwardly-extending projections 7 on the tire. In Figs. 5 and 6 the interlocking means comprises a pin-and-slot connection between the tire and felly side plates by providing the side plates with radially-elongated grooves 8 and 9 and the tire with transverse pins 10, having their ends projecting into the said slots.

The tire 5 is provided with a plurality of holes 11, extending transversely thereto, into which holes are inserted springs 12. These springs have their axes substantially parallel with the axis of the wheel-felly and are held in position by the felly side plates 3 and 4. Each of these springs is radially compressible and comprises an annular series of flattened coils, so as to permit the springs to have a very extended engagement with the walls of the transverse holes in the tire. It will thus be seen that these springs are embedded wholly within the tire and serve to add to the resiliency thereof to a greater or lesser extent, according to the strength of the springs. By forming each of these springs of an annular series of flattened coils it will be seen that there is no chafing action between the springs and the walls of the holes within the tire, and thus any tendency of the tire to wear at these points is obviated.

What I claim is—

1. The combination with a wheel-felly and a tire of yielding material, of radially-compressible springs embedded in the tire, each spring comprising an annular series of coils.

2. The combination with a wheel-felly and a tire of yielding material, of radially-compressible springs embedded in the tire, each spring comprising an annular series of longitudinally-flattened coils.

3. The combination with a wheel-felly and a tire of yielding material, of radially-compressible springs embedded in the tire, each spring comprising an annular series of longitudinally-flattened coils having rounded ends.

4. The combination with a wheel-felly and a tire of yielding material having interlocking projections, of springs wholly embedded within the tire.

5. The combination with a wheel-felly and a tire of yielding material having interlocking projections and side plates for confining the tire against lateral displacement, of springs wholly embedded within the tire.

6. The combination with a wheel-felly having side plates, of a tire of yielding material located between the side plates, and radially-compressible springs each comprising an annular series of coils extending across the tire transversely thereto, the said felly side plates forming abutments for the ends of the springs and serving to hold the tire and its springs against lateral displacement.

In testimony that I claim the foregoing as my invention I have signed my name, in the presence of two witnesses, this 16th day of October, 1905.

FREDERICK J. LANCASTER.

Witnesses:
FREDK. HAYNES,
F. GEORGE BARRY.